US012591941B2

(12) United States Patent
Kanner et al.

(10) Patent No.: US 12,591,941 B2
(45) Date of Patent: Mar. 31, 2026

(54) MEDIA MANAGEMENT SYSTEM

(71) Applicant: Oracle America, Inc., Redwood Shores, CA (US)

(72) Inventors: Joshua Kanner, Cambridge, MA (US); Andrew J. Hiser, Lexington, MA (US); Sean D. True, Natick, MA (US)

(73) Assignee: Oracle America, Inc., Redwood Shores, CA (US)

( * ) Notice: Subject to any disclaimer, the term of this patent is extended or adjusted under 35 U.S.C. 154(b) by 0 days.

(21) Appl. No.: 18/951,994

(22) Filed: Nov. 19, 2024

(65) Prior Publication Data

US 2025/0078180 A1 Mar. 6, 2025

Related U.S. Application Data

(63) Continuation of application No. 18/315,994, filed on May 11, 2023, now Pat. No. 12,182,889, which is a continuation of application No. 16/850,881, filed on Apr. 16, 2020, now Pat. No. 11,676,223, which is a continuation of application No. 15/278,754, filed on Sep. 28, 2016, now Pat. No. 10,643,291.

(60) Provisional application No. 62/336,816, filed on May 16, 2016, provisional application No. 62/233,864, filed on Sep. 28, 2015.

(51) Int. Cl.
*G06F 7/00* (2006.01)
*G06Q 10/10* (2023.01)
*G06Q 50/08* (2012.01)

(52) U.S. Cl.
CPC ............. *G06Q 50/08* (2013.01); *G06Q 10/10* (2013.01)

(58) Field of Classification Search
CPC ............................... G06Q 50/08; G06N 20/00
USPC .................................... 707/600–899; 705/313
See application file for complete search history.

(56) References Cited

U.S. PATENT DOCUMENTS

| | | | |
|---|---|---|---|
| 10,643,291 B2 | 5/2020 | Kanner et al. | |
| 11,676,223 B2 | 6/2023 | Kanner et al. | |
| 2002/0022956 A1 | 2/2002 | Ukrainczyk et al. | |

(Continued)

OTHER PUBLICATIONS

Final Office Action for U.S. Appl. No. 16/850,881, dated Sep. 13, 2022.

(Continued)

*Primary Examiner* — Isaac M Woo
(74) *Attorney, Agent, or Firm* — Mughal Gaudry & Franklin PC

(57) ABSTRACT

Described herein are various techniques for managing media related to a construction project, which may relate to one or more buildings to be built and/or renovated as part of the construction project. In accordance with techniques described herein, the media may be managed according to information regarding the construction project that is stored by one or more other systems separate from a media management system. The other systems may be construction information management systems that each store information regarding a construction project, including information relating to planning and/or execution of the construction project. For example, the media management system may generate tags based on the information regarding the construction project, may be trained to recognize features in the media that relate to the tags, and add the appropriate tags to the media based on the recognized features.

26 Claims, 4 Drawing Sheets

(56)           References Cited

U.S. PATENT DOCUMENTS

2007/0027732  A1      2/2007  Hudgens
2013/0279796  A1     10/2013  Kaizerman et al.
2016/0034784  A1*     2/2016  Ohmura .................. G06T 7/254
                                                382/103
2017/0091879  A1      3/2017  Kanner et al.

OTHER PUBLICATIONS

Non-Final Office Action for U.S. Appl. No. 15/278,754, dated Oct. 28, 2019.
Non-Final Office Action for U.S. Appl. No. 16/850,881, dated Feb. 11, 2022.
Non-Final Office Action for U.S. Appl. No. 18/315,994, dated Apr. 23, 2024.
Notice of Allowance for U.S. Appl. No. 15/278,754, dated Jan. 23, 2020.
Notice of Allowance for U.S. Appl. No. 16/850,881, dated Feb. 2, 2023.
Notice of Allowance for U.S. Appl. No. 18/315,994, dated Aug. 19, 2024.

\* cited by examiner

200

300

400 Computing device

402 Processor(s)

404 Network adapter(s)

406 Computer-readable storage media

408 Media management facility

410 Construction information management facilities

412 Media

414 Construction project information

416 Elements

MEDIA MANAGEMENT SYSTEM

RELATED APPLICATIONS

This application is a Continuation of U.S. patent application Ser. No. 18/315,994, entitled "MEDIA MANAGEMENT SYSTEM," filed May 11, 2023, which is a Continuation of U.S. patent application Ser. No. 16/850,881, entitled "MEDIA MANAGEMENT SYSTEM," filed Apr. 16, 2020, and issued as U.S. Pat. No. 11,676,223, which is a Continuation of U.S. patent application Ser. No. 15/278,754, entitled "MEDIA MANAGEMENT SYSTEM," filed Sep. 28, 2016 and issued as U.S. Pat. No. 10,643,291, which claims priority under 35 U.S.C. § 119(e) to U.S. Provisional Application Ser. No. 62/233,864, entitled "MEDIA MANAGEMENT SYSTEM," filed on Sep. 28, 2015, and also claims priority under 35 U.S.C. § 119(e) to U.S. Provisional Application Ser. No. 62/336,816, entitled "MEDIA MANAGEMENT SYSTEM," filed on May 16, 2016. Each of these applications is hereby incorporated by reference in its entirety for all purposes.

BACKGROUND

Construction projects typically include numerous inspections throughout the construction process. For example, a foundation of a building may be inspected for various defects shortly after it is constructed. Inspectors may capture images of the construction project during these inspections for subsequent review and evaluation. After the inspection is complete, the captured images from the inspection may be saved in a computer directory with other captured images from other inspections. Once the construction project is complete, the captured images stored in the directory are provided to the building operations team responsible for running and maintaining the building.

SUMMARY

According to at least one aspect, a method of managing media regarding a construction project according to information regarding the construction project stored by one or more construction information management systems implemented via at least one first processor is provided. The media includes audio and/or visual content and the one or more construction information management systems stores information on planning and/or execution of the construction project. The construction project includes at least one structure to be built, maintained, and/or renovated according to a plan for the construction project. The plan includes a design of the at least one structure identifying components of the at least one structure. The method includes based on determining that a first element of the information regarding the construction project is to be used by a media management system implemented via at least one second processor to organize the media, configuring a first construction information management system, of the one or more construction information management systems, that stores information from which the first element was identified to request from the media management system media that is associated with the first element.

In some embodiments, configuring the first construction information management system to request media that is associated with the first element includes configuring the first construction information management system to communicate with the media management system to access information stored by the media management system and associated with the first element. In some embodiments, configuring the first construction information management system to communicate with the media management system to access information associated with the first element includes requesting that the first construction information management system store, in association with the first element in at least one data store of the first construction information management system, information to access media stored by the media management in association with the first element. In some embodiments, the first construction information management system is a building design tool implemented via the at least one first processor, the information regarding the construction project stored by the building design tool includes a Building Information Model (BIM) including information on the design of the at least one structure, the BIM including one or more data objects identifying the components of the at least one structure, the one or more data objects including a first data object associated with the first element. In some embodiments, requesting that the first construction information management system store the information to access the media stored by the media management in association with the first element includes requesting that the building design tool store in association with the first data object data instructing the media management system to provide media associated with the first element. In some embodiments, requesting that the building design tool store, in association with the first data object, the information to instruct the media management system to provide the media includes requesting that the building design tool store, as an attribute of the first data object, a universal resource locator (URL) to access media stored by the media management system.

In some embodiments, configuring the first construction information management system to communicate with the media management system to access information associated with the first element includes requesting that the first construction information management system store, in association with the first element in at least one data store of the first construction information management system, information to access information regarding media stored by the media management system in association with the first element. In some embodiments, requesting that the first construction information management system store the information to access information regarding media includes requesting that the first construction information management system store information to request a count of media stored by the media management system in association with the first element.

In some embodiments, configuring the first construction information management system to request from the media management system media that is associated with the first element includes configuring the first construction information system to output, via a user interface displaying information regarding the first element that is stored by the first construction information management system, an option for a user to request media associated with the first element. In some embodiments, configuring the first construction information system to output the option via the user interface includes configuring the first construction information system to output the option via a two-dimensional display device connected to a personal computing device. In some embodiments, configuring the first construction information system to output the option via the user interface includes configuring the first construction information system to output the option via a three-dimensional display interface of an immersive 3D display device.

In some embodiments, the method further includes in response to receiving a request for media associated with the first element, the request identifying the first element, identifying one or more media units with which the first element is associated as metadata and outputting for display a listing of the one or more media units. In some embodiments, the one or more construction information management systems include a scheduling system, an accounting system, a safety management system, and/or a building design tool.

According to at least one aspect, a media management system is provided. The media management system includes at least one processor and at least one storage medium having encoded thereon executable instructions that, when executed by the at least one processor, cause the at least one processor to carry out a method. The method includes training a model to recognize a defect in an object using a plurality of media descriptive of the defect in the object, where training the model includes extracting features corresponding to the defect from portions of the plurality of media descriptive of the defect, the portions of the plurality of media being associated with data indicating that the portions correspond to the defect, further training the model using scale training data to recognize at least one dimension of the defect, where the scale training data includes at least some of the plurality of media, where the at least some of the plurality of media depicts at least one other object, and where training the model using the scale training data includes determining a scale for the at least some of the plurality of media in the scale training data based on at least one known dimension of the at least one other object and determining a dimension of the defect in the object in the at least some of the plurality of media based on the scale, receiving media including content relating to a premises, processing the media using the model to identify the defect in the media including content relating to the premises using the model and to determine a dimension of the defect in the media, and adding at least one tag to the media responsive to identifying the defect in the media including content relating to the premises, the at least one tag being descriptive of a presence of the defect and the at least one dimension of the defect.

In some embodiments, the media including content relating to the premises is an image of the premises, the defect is a crack in a wall, and the at least one dimension of the defect includes a length of the crack or a width of the crack. In some embodiments, identifying the defect includes identifying a number of pixels illustrating the crack and generating a crack score based on the number of pixels illustrating the crack and where adding the at least one tag to the media includes adding a crack score tag descriptive of the crack score to the media.

In some embodiments, the defect is a defect in a piece of equipment. In some embodiments, outputting the tagged media includes at least one of: storing the tagged media in a non-transitory computer readable medium, displaying the tagged media in a user interface, and transmitting the tagged media to another system. In some embodiments, outputting the tagged media includes providing a link to the tagged media to an external system and providing the tagged media to the external system responsive to the link being activated.

According to at least one aspect, a media management system is provided. The media management system includes at least one processor and at least one storage medium having encoded thereon executable instructions that, when executed by the at least one processor, cause the at least one processor to carry out a method. The method includes receiving training media descriptive of a worker missing at least one piece of safety equipment, receiving annotations in the training media indicative of a presence or an absence of the safety violation in the training media, training a model using the annotated training media to detect the safety violation, receiving the media including content relating to a construction project, identifying the safety violation in the media including content relating to the construction project using the model, and adding at least one tag to the media responsive to identifying the safety violating in the media including content relating to the construction project, the at least one tag being descriptive of a presence of the safety violation.

In some embodiments, the safety equipment includes at least one of: a hardhat, a harness, a respirator, and safety glasses. In some embodiments, the method further includes retrieving information from at least one data store indicative of at least one user to be notified when an enrolled tag is added to the media in response to adding the at least one tag to the media, comparing the at least one tag added to the media with the enrolled tag to determine whether the at least one tag added to the media matches the enrolled tag, and providing a notification to the at least one user regarding the tagged media in response to determining that the at least one tag matches the enrolled tag.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
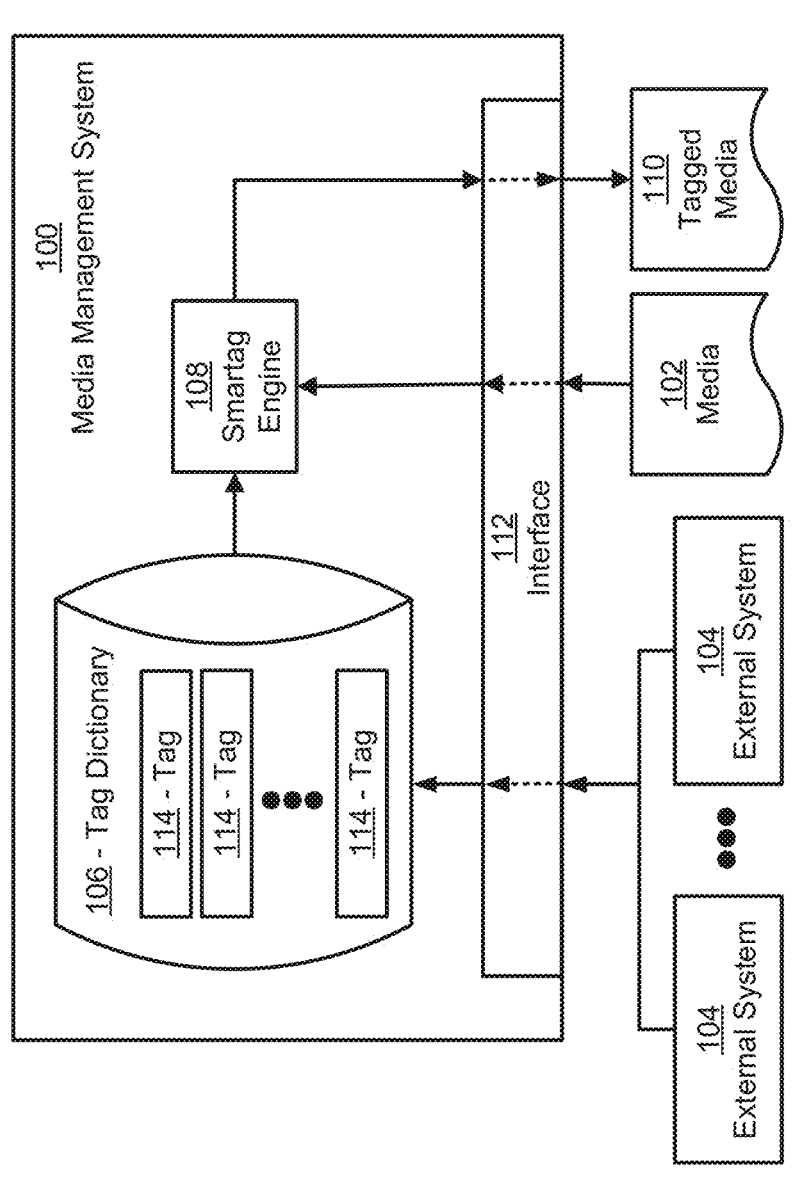
FIG. 1 is a block diagram of an example media management system.

The inventors have recognized and appreciated the advantages that would be offered through techniques for analyzing, identifying, and documenting contents of media captured at a premises. As discussed below, the digital data of media captured at a premises—which may include audio, video, still images, 3D image captures, or other types of media content—may be processed to identify what is depicted or described in the media. This may include, for example, identifying a particular feature of a building or other construction site that is documented by the media. The inventors have recognized and appreciated that by analyzing the media content to identify what is depicted therein, a better form of media management may be offered, including by associating media with metadata or other information identifying what is depicted therein.

Accordingly, described herein are techniques for training or otherwise configuring a media management system to recognize contents of media. When the media relates to a construction project, the media management system may be trained to recognize items in the media, including equipment, people, buildings, and/or portions of buildings, among other items. As another example, when the media relates to a construction project, the media management system may be trained to recognize flaws, defects, or other conditions of a construction project that may require remedy. For example, if a construction project is a tunnel, the media management system may be trained to recognize in media of the tunnel cracks in walls of the tunnel, including by detecting dimensions of depicted cracks so as to identify which cracks may need immediate or otherwise prioritized repair.

The inventors have recognized and appreciated that modern construction projects and other premises may be repeatedly inspected over time (e.g., throughout the construction project) and that each inspection may generate a wealth of captured media. The inventors have also recognized and appreciated that the amount of media generated through such repeated inspections dwarfs traditional techniques for media management, and becomes burdensome on users to the point of rendering a great deal of media effectively inaccessible to the users due to simple inability to find relevant media. For example, a building operations team may need to sort through thousands of images in a single computer directory to locate an image showing a particular electrical junction box in a room of the building. The inventors have recognized and appreciated the advantages that would be offered through techniques for analyzing, identifying, and documenting contents of media on behalf of users, so as to identify what is depicted in media. For example, by analyzing media to identify contents and subsequently "tagging" the media so as to indicate the identified contents, a media management system may make the media locatable by users who are interested in finding media depicting particular contents.

Accordingly, aspects of the present disclosure relate to media management systems that address the technological problem of parsing, analyzing, labeling, and managing media related to inspection of premises of various types. For example, the media regarding inspection of a premises may be managed according to information regarding the premises and/or inspection of premises that is stored by one or more other information management systems separate from the media management system.

Such an inspection of a premises may be performed as a routine inspection, such as a periodic inspection, or may be triggered by an event, such as reaching a milestone in a construction schedule or a claim filed against an insurance policy. The inspection may be performed by or on behalf of any suitable party, including a person who owns, works at, and/or lives at the premises, or any outside party, such as an owner and/or manager of a construction company performing a construction project at the premises or an insurance entity for an insurance policy for or that is to be the premises.

Media related to the inspection of premises may include media documenting the premises, including documenting a condition of the premises, contents of the premises, and/or practices of people living and/or working at the premises or otherwise at the premises during the inspection. As discussed in further detail below, the media documenting the premises may be managed according to information retrieved from one or more information management systems storing information regarding the premises.

The types of premises with which embodiments may operate include commercial, civil, infrastructure, and residential premises, including land of the premises and/or structures of one or more types, or portions of the structures, on the land. In some cases, the structure(s) of the premises may relate to a construction project that is to build, maintain, and/or renovate the structures, such as construction projects classified in Standard Industrial Classification (SIC) classifications 15, 16, and 17 and in North American Industry Classification System (NAICS) classifications 236, 237, and 238. Premises may thus relate to one or more residential and/or commercial buildings, energy/utility facilities (e.g., oil and gas facilities, wind farms, solar arrays, etc.), stadiums, hospitals, roads, and more, which may already be built or that are to be built, maintained, and/or renovated as part of the construction project.

In accordance with techniques described herein, media regarding inspection of a premises may be managed according to information regarding the premises and/or inspection of premises that is stored by one or more other systems separate from a media management system. The other systems may be information management systems that each store information regarding premises or inspection of premises. The information management systems may store information on policies maintained by consumers of results of inspections of premises, which may apply or are to apply to the premises. Such consumers of inspection results may include managers of construction projects, safety regulators (including industry-affiliated or government-affiliated safety regulators), insurance entities, issuers of loans secured by a premises, premises appraisers, or others.

Insurance entities that maintain policies and that may consume inspection results may include entities involved in underwriting of insurance policies, ensuring compliance with insurance policies, and/or processing of claims made against an insurance policy. Such insurance may be residential insurance and/or commercial insurance, based on the nature of the insured premises. Such processing of claims may include triaging claims to select an adjuster and adjusting a claim to determine a monetary value of a claim, whether an issuer of an insurance policy is liable for the monetary value, and/or whether any other party is liable for the monetary value.

In embodiments in which the media management system manages at least some media according to information related to an insurance entity, one or more information management systems store information on policies related to insurance. One or more of the policies may apply to the premises or is to apply to the premises, such as once underwriting is completed, an agreement is signed, or other step is taken. The information on the policies may relate to practices that may be encouraged, required, or prohibited by one or more insurance policies, including policies that may be or are to be applicable to the premises. The information on the policies may relate to conditions of premises, including conditions of land and/or of structures, that may be relevant to an insurance policy or a claim. Such conditions of premises may relate to zoning or building code regulations, or safety regulations that are applied by an industry group, a government agency, and/or an insurance entity. The information on the policies may also relate to personal property that may be included in a premises, such as personal property that may or may not be covered by insurance policies that may be or are to be applicable to the premises. Such information that relates to personal property may relate to or be used to identify personal property that is disposed in a premises during the inspection, which may include or be used to identify a value of the personal property, which in turn may be used to determine an amount of coverage for a policy and/or an amount for a claim. Accordingly, in some embodiments in which a consumer of media regarding an inspection of a premises is an insurance entity, a media management system may manage media in accordance with information stored by an information management system regarding policies of an insurance entity.

In some embodiments, issuers of loans that are secured by a premises, such as banks or other financial institutions, may appraise a premises before issuing such a loan. This may be the case, for example, for a mortgage or home equity line of credit. Premises may be appraised for other reasons, too. Such parties may maintain policies related to appraisal or related to the premises. The information on the policies may relate to practices that may be encouraged, required, or prohibited by one or more loans, including loans that may be or are to be applicable to the premises. For example, a loan may specify that some specified types of commercial practices are prohibited at a residence. The information on the policies may relate to conditions of premises, including conditions of land and/or of structures, that may be relevant to appraisal. Such conditions of premises may relate to zoning or building code regulations, or safety regulations that are applied by an industry group, a government agency, and/or an insurance entity. Accordingly, in some embodiments in which a consumer of media regarding an inspection of a premises is a loan issuer or appraisal entity, a media management system may manage media in accordance with information stored by an information management system regarding policies of a loan issuer or appraisal entity.

In some embodiments in which one or more premises may relate to a construction project, the information regarding premises or inspection of premises stored by the information management system(s) may include information relating to planning and/or execution of a construction project. Further details of information that may relate to planning and/or execution of a construction project should be appreciated from the examples provided below. For case of description, many examples below will be described in connection with construction projects that relate to buildings and to construction projects, and to inspections of construction projects by or on behalf of owners of premises under construction (including renovation) and/or managers of the construction projects. It should be understood, however, that each of these examples may be applied to other types of premises, including the illustrative types of premises and inspections listed above.

The media related to a premises, such as a construction project, may include audio and/or visual content captured at the premises. Where the premises is a construction site for the construction project, the media may contain content related to a progress or current state of the construction project. For other types of premises, such as land and/or buildings that are not construction sites, the media may depict a current condition of the premises and/or practices at the premises.

A large amount of media is generated on inspections of premises, particularly for modern construction sites or insurance inspections, which may include still images, video, and/or audio captured as an inspector (e.g., construction personnel or others) documents the premises. Managers of construction projects, insurers, customers of construction companies, or others may benefit from techniques for organizing and managing the media, and potentially making the media more accessible and useful.

The inventors recognized and appreciated that each media unit (e.g., each still image, video clip, and/or audio clip) may include content related to a premises in different ways, such as by depicting different components of the building(s) that are being built and/or renovated as part of the construction project in the case that a premises is a construction site. The inventors further recognized and appreciated that information management systems may store in one or more data stores information relating to content that may be depicted in media captured at a premises, such as components of a building at the premises. For example, one construction information management system may be a building or engineering design tool (referred to as a building design tool below), which may store a two- or three-dimensional design of a building to be built and/or renovated as part of a construction project. The design, which may be in the form of a Building Information Model (BIM), may include data objects for each of multiple different components of a building, such as materials, equipment, or rooms, or for other elements of a construction project. Similarly, a scheduling system may store in a data store information on a construction schedule at a construction site, including times at which construction on components of a construction project is to be started and ended and times for a supply chain for the construction project, each of which elements may relate to other elements of a project such as materials, equipment, or rooms. The inventors have also recognized and appreciated that other types of information management systems may be used by other consumers of inspections of premises, such as information used by insurance entities, loan issuers, premises appraisers, or others.

The inventors have recognized and appreciated that the information stored in information management systems regarding a premises may be advantageously used for organizing media regarding the premises. For example, by determining from an information management system information regarding elements that may be depicted in media captured at a site, and subsequently matching those elements to media that depict those elements and organizing the media according to those elements, the media may be more effectively arranged and used.

Accordingly, described herein are specific techniques for communicating between a media management system, executing on at least one computing device, and one or more information management systems, also executing on at least one computing device (which may be the same or different devices) to exchange information relating to an inspection of a premises. As should be appreciated from the foregoing, the premises may be a construction project and the information management system(s) may include one or more construction information management systems, but embodiments are not so limited.

For example, in some embodiments, information regarding a premises, and/or inspection of a premises, that is stored in one or more data stores by one or more information management systems may be evaluated by the media management system to determine metadata that may be applied to media. The media may be of and/or related to the premises and may have resulted from an inspection of the premises. The media management system may determine the metadata to be applied to aid in the organization and management of the media. More specifically, the media management system may receive, or retrieve, from each of the information management system(s) at least some of the data stored by those systems. The data that is obtained may include data regarding components of one or more structures of the premises, such as materials, equipment, rooms, or other components of the structure(s) at the premises, including structures to be built or renovated, and one or more policies that may apply to the premises or be used in evaluating the premises and/or media resulting from the inspection. In the case that the premises is a construction project, the obtained data may include information regarding the planning and/or execution of the construction project and the media management system may then evaluate the obtained data and extract one or more elements of the planning and/or execution of the construction project. Similarly, obtained data may include information regarding one or more insurance policies that are or are to be applicable to the premises, and the media management system may evaluate the obtained data and extract one or more elements that are terms of the policy(ies). For example, an extracted element may relate to practices that are encouraged or prohibited by the insurance policy, or to personal property that is or is not covered by the policy.

In the case of construction information management systems, data may be obtained from construction information management systems of various types. For example, scheduling systems that manage information relating to a timeline for the construction project and/or supply chain management may supply information to the media management system. This may include information on scheduling phases of the project that may be used to organize media relating to those phases. As another example, accounting systems that may manage information relating to costs for the construction project may supply information to the media management system. This may be used to organize media depicting practices that are consistent or inconsistent with cost estimates for a project (e.g., a still image showing more workers than budgeted for a particular day or task). As a third example, safety management systems that store information on company or government safety policies may supply information to the media management system, such as information on safety policies that may be associated with media showing compliance with or violations of the policies. This may be used to organize media depicting practices that are consistent or inconsistent with the safety policies. As another example, design systems, such as building design tools, that may be used to design constructions projects may supply information, such as information regarding one or more components of a building to be built or renovated as part of the constructions project. Such building design tools may include drafting tools, such as computer-aided design (CAD) tools. These tools may create models of construction projects that include information relating to a design of the construction projects, such as in the form of a digital rendering of the building(s) to be built or renovated, which may be a two- or three-dimensional rendering. Such a model may be a Building Information Model (BIM) in some embodiments. The model may include data objects related to components of a construction project, such as materials, equipment, rooms, or other features of a building or of a construction project. The data objects may be arranged hierarchically, such as by arranging data objects for a room hierarchically below data objects for a wing of a building, data objects for equipment or materials for a room hierarchically below a data object for that room, etc. In some embodiments, each data object may include attribute information for the data object, such as indicating a type of the data object that identifies a type of the component of the building or project with which the data object is related. The data object may also include an identifier for the data object. These data objects, or other information stored by a building design tool, may be used to organize media by associating the media with data objects of components depicting or described by the media.

In some embodiments, the elements that are identified by the media management system may be elements of a specific type. For example, when data received from the construction information management system(s) includes data objects related to multiple different types of elements of the construction project, the media management system may select from, or filter, the data objects to identify those data objects, and/or attributes of those data objects, that relate to a particular type of element. In embodiments that perform such selection or filtering, the elements that are identified may be ones that relate to visible elements of a construction projects, such as tangible components of a building like rooms, materials, or equipment, or other visible elements such as phase of a construction project or safety policies. These elements may be identified because they may be elements that may appear in media related to the construction project, such as still images or video depicting the construction project or audio (e.g., speech) describing the construction project.

Each of the elements identified by the media management system from the received information may have an identifier that is stored by the construction information management systems from which the elements were obtained and that may be used to organize media. For example, where the elements include data objects, a data object may include an identifier for the data object that may be identified by the media management system for use as an element to organize media. The elements may be used by the media management system including by being associated with media units as metadata. For example, an identifier for an element may be assigned as metadata to media that relates to the element. In the case of a still image of a room of a building, an identifier for the room that has been derived from information stored by a construction information management system may be assigned as metadata to the still image, as the still image relates to that room. The identifier for the room may then be usable in the media management system to find the still image of the room, such as by accessing data associated with the identifier (e.g., in response to an Application Programming Interface (API) call or other function call) or performing a search of metadata associated with media for metadata including that identifier.

In embodiments in which elements are used to assign metadata to media, the media management system may assign metadata in various ways. For example, the media management system may store within a data structure of the media (e.g., within a file for the media) the information to be used as metadata, such as the identifier for an element. As another example, the media management system may store the metadata separate from the media, such as by storing the media in one data structure (e.g., a column in a table of a database, or other data structure) and storing the metadata in another data structure (e.g., a separate table of the database, or a separate column of the same database table used to store the media, or another structure).

In some embodiments, the media management system may associate elements with media by associating the elements as a "tag" of the media. In some such embodiments, the media management system may maintain a data structure listing tags that are available to be applied to media. Such a data structure may be known as a tag dictionary or tag vocabulary. The tags that are listed may be applied by the media management system in response to a determination by the media management system that a particular media unit includes content to which the tag is applicable (e.g., depicts or describes a building component with which the tag is related) or a request from a user to assign the tag to the content.

As another example of a manner in which a media management tool and a construction information management system may communicate in some embodiments, the media management tool may configure a construction information management system to retrieve media that is associated with a data element that is stored by the system. For example, a media management system may, as described above, evaluate information stored by a construction information management system and extract one or more elements that may be associated as metadata with media. Following performance of that process for one or more construction information management systems, the media management system may, for an element that was determined or derived from information received from a first construction information management system and is to be used to manage media, communicate to the first construction information management system regarding that element. For example, the media management system may configure the first construction information management system to request from the media management system media that is associated with that element or information regarding that media, such as a count of that media. Such a request may be in the form of an access of data stored by the media management system, such as an Application Programming Interface (API) call or other function call to access the data associated with the element. Such a call may include an identifier for the element that, as discussed above, may be the same identifier as is used in the construction information management system to identifier the element. The request may alternatively be in the form of a request to initiate a search for the element. The information that is communicated from the media management system to the first construction information management system may be in any suitable form, including as a universal resource locator (URL) that, when accessed, causes the media management system to access media or information, or to initiate a search.

The information that is stored in the construction information management systems may be in various forms, including examples described above. As mentioned above, in some embodiments a construction information management system may be a building design tool that stores a Building Information Model (BIM) or other information regarding a design of a construction project, which may include data objects for each of various components of a project. In a case that a construction information management system stores information in data objects, these data objects may be used by the media management system to configure the construction information management system to retrieve media associated with elements. For example, in the case of a building design tool, the media management system may communicate to the building design tool information to enable access of data stored by the media management system (e.g., an API call) or to trigger a search based on a particular element that is associated with a data object stored by the building design tool, such as a data object of a BIM. The media management system may communicate a request to the building design tool to store the information to trigger the search in a particular data object, such as by identifying the data object using an identifier for the data object that was previously received by the media management system. In response to the request, the building design tool may store the information in the data object.

When a construction information management system has been configured in this way to access data of or trigger a search of the media management system, the construction information management system may present via a user interface of the system an option to access the data of or to trigger a search of the media management system or otherwise retrieve media from the media management system.

For example, the user interface may be a user interface via which the construction information management system displays information stored by the system, such as information on one or more components of a construction project. In the case of a building design tool, the user interface may be a user interface by which the tool outputs a rendering of a building design and/or outputs information on one or more components identified by data objects within the BIM. When information regarding a particular component (or other element of a construction project) is output, and the construction information management system has been configured by the media management system to enable access to or search of media related to that component (e.g., by storing an API call or search information in connection with that component), the option to access or trigger a search may be displayed together with other information regarding that component. The option may be presented in any suitable manner, including by displaying a URL that, when accessed, access data of or triggers a search by the media management system.

As another example of a manner in which media regarding a construction project may be managed in some embodiments, embodiments may be configured to output a listing of elements and, for each element, a listing of media with which those elements are associated as metadata. The elements that are listed may include elements determined or derived from information provided to the media management system by one or more construction information management systems, as described above. This listing may be used by a user of the media management system to determine whether sufficient media is being captured for a particular data element. For example, by reviewing the list of elements and the media that is associated with each element, a user may be able to identify whether there is no media associated with a particular data element or less media than may be desirable. As media may be used by a construction company, owner's representatives, consulting firm, insurance company, or others to document the construction project, if no or little media is being captured for a particular element, such as a particular component of the construction project, the construction project may be insufficiently documented or documented at a level less than desired.

In some embodiments, in addition to or as an alternative to displaying such a listing, the media management system may evaluate the media associated with a particular element to determine whether the media satisfies one or more criteria. Various types of criteria may be evaluated. For example, an amount of media associated with an element, a type of media associated with an element (e.g., still image, video, and/or audio), times at which the media was captured such as whether media was captured consistently or inconsistently over a time period or whether there was a time period at which media was not captured, or information regarding media may be evaluated.

In embodiments that evaluate media to determine whether one or more criteria are satisfied, the criteria by which the media management system may evaluate media may vary between elements, such as by varying between different types of elements. A type of an element may be based on the type of information regarding the construction project from which the element was determined or derived. For example, some elements may relate to rooms, equipment, or materials of a construction project, while other elements may relate to scheduling phases or safety procedures for a construction project. Different criteria may be used for different elements or types of elements because a cause or reason for an alert may vary between elements. For example, for an element related to a room or piece of equipment for a construction project, a reason for alarm may be that an insufficient or low number of media have been captured, and accordingly a criteria may be whether a count of media is below a threshold. As another example, for an element related to violations of safety procedures, a reason for alarm may be that a high number of media depicting violations have been captured, and accordingly a criteria may be whether a count of media is above a threshold. A threshold may also vary between elements or types of elements, as a desired number of media for each element may vary.

In embodiments that include a listing of media content, a thumbnail may be output for each media content. The thumbnail may be derived in any suitable manner. It should be appreciated that a media unit may include audio and/or video content for a period of time and that only a portion of the audio or video content may apply to a particular element. For example, video content may include content captured as a capture device moves around a construction site, and the video content may include multiple clips that each relate to different components of the construction project. An element associated with such media unit may only be associated with a clip of the audio/video content. In such a case, when the media unit is to be included in a listing identifying that the media unit relates to an element, only the clip of the media unit that is associated with the element may be used to determine the thumbnail.

In some embodiments, in addition to using information stored by one or more construction information management systems to determine elements that may, in general, be applied to media that is managed by a media management system, the media management system may also use the information from the construction information management system(s) to determine metadata to be applied to a particular media unit.

For example, the media management system may use information regarding a location at which media was captured using a capture device (e.g., an image capture device such as a camera and/or a microphone, which may be a component of another device such as a mobile phone or unmanned aerial vehicle (UAV)) and, in some cases, an orientation of the capture device at a time that the media was captured. The location and orientation may be a location and orientation in a two-dimensional or three-dimensional space. For example, the location may be identified as latitude, longitude, and altitude. As another example, coordinates triangulated or otherwise determined within a construction site using a more localized measurement system may be used. Orientation may indicate an angle of the capture device.

Information on location and orientation may be used to identify one or more components of a construction project to which a media unit may relate, by determining one or more components of the construction project that were in front of (e.g., in a field of view of) or otherwise proximate to the capture device or a user of the capture device when the media unit was captured. This may be because the media unit may be likely to relate to components of the construction project that were in front of the capture device, such as by being an image of a component of the construction project in front of the capture device.

To determine the components of the construction project that may relate to the media unit, the media management system compares the location and orientation information for the media unit to information regarding the construction project stored by one or more construction information management systems. For example, a building design tool that stores a Building Information Model (BIM) may store a coordinate system for the model that is indexed to real-world coordinates. For example, the building design tool may store a latitude, longitude, and altitude for an origin point within a BIM and may store information regarding a scale of the BIM. The origin point and scale information may be used by the media management system to determine a point within the BIM coordinate system that corresponds to a location of the capture device at a time the media unit was captured. For example, the media management system may provide the location information (e.g., latitude, longitude, and altitude) to the building design tool and request that the tool identify a corresponding position in the BIM coordinate system. Alternatively, the media management system may obtain from the building design tool the origin and scale information and make the determination. Once a corresponding position within the BIM is determined, the media management system may also identify one or more components of the construction project to which the media unit may relate, by evaluating the corresponding position within the BIM and, in some cases, evaluating the orientation information to identify a field of view of the capture device at that location. For example, if the corresponding position is within a room, the media unit may be associated with an element identifying that the media unit relates to the room. If the corresponding position is outside the building and the orientation indicates that the capture device was pointed at a particular corner of the building, the media unit may be associated with an element indicating that the media unit presents a view of that corner of the building. Other elements may be similarly determined based on the corresponding position within the BIM coordinate system.

It should be appreciated that a media unit may include audio and/or video content for a period of time and that only a portion of the audio or video content may apply to a particular element. For example, video content may include content captured as a capture device moves around a construction site, and the video content may include multiple clips that each relate to different components of the construction project. Accordingly, for a media unit that includes audio or video content, associated location/orientation data may include multiple locations and orientations for a period of time. In such cases, location/orientation information for a particular time or period of time, such as for a span of seconds, may be used to determine an element to relate to that particular time or period of time.

Examples of Specific Embodiments

Described below are examples of specific embodiments of media management systems implemented according to techniques described herein. It should be appreciated that these examples are merely illustrative of the types of systems that may be implemented, and that embodiments are not limited to operating in accordance with any of these examples. Some examples described below are described in connection with FIG. 1.

Described herein are various embodiments of a multimedia management system 100. As shown, the media management system 100 receives media 102 through an interface 112. The media management system 100 may employ a smartag engine 108 to identify features in the media 102 that match a tag 114 in a tag dictionary 106. The smartag engine 108 may add the tags 114 that match the media 102 to create tagged media 110. The tagged media 110 may be output in any of a variety of ways. For example, the tagged media 110 may be stored in a non-transitory computer readable medium and/or displayed to users via the interface 112. The tags 114 in the tag dictionary 106 may be generated based on information received from external systems 104, such as construct systems, via the interface 112.

The media management system 100 may be implemented using web-based software hosted on a server that is delivered to its users over the Internet via a browser, though other architectures may be used. In some embodiments, the media management system 100 may be configured to manage media for a single user (e.g., single human user, or single entity such as a business entity that may be associated with many different human users), such as by storing in a data store (e.g., a database) only media associated with the single user of the media management system 100 and only receiving or transmitting media or information regarding the media to, from, or on behalf of the single user. In other embodiments, a media management system 100 may be configured to manage media for multiple different users (e.g., multiple different human users and/or multiple different entities). In embodiments in which a media management system 100 is configured to manage media for multiple users, the media management system 100 may be implemented as a multi-tenant single instance (MTSI) architecture in which multiple users of the media management system 100 all use the same single-instance of a database. In some such MTSI architectures, users of media management system 100 may maintain privacy and security of their data through data segmentation. Data within the media management system 100 may be segmented into a hierarchy of unique Organizations, Projects, and Users.

Organizations may be defined as specific business entities that may participate in a project. Specific examples of organizations involved on a construction project may include but not be limited to the following: Contractor, Owner, Architect, Engineer, Owner's Representative, Trade Contractors (e.g., electrical, plumbing, HVAC), and Sub-consultants. Each organization may be created similarly in the system. They may include an organization name, description, logo for visual representation, and a list of users.

Projects refer to actual physical construction or renovation activities. Examples of projects may include various types including commercial, civil, infrastructure, and residential (as defined by SIC codes 15, 16 and 17 or NAICS codes 236, 237, 238). These construction types thus may relate to one or more buildings, oil and gas facilities, stadiums, hospitals and more. Projects may be defined by a scope of work between an owner and the firm(s) executing the work. A set of contract documents define this scope as well as the relevant payment terms. The work executed by the various organizations who are contractually related to the project can be the subject of the video and photo footage that can be managed within the system. The footage can be used to help with satisfaction of the terms required for payment under the contract.

Users may be associated with Organizations (e.g., User "Bob" exists within Organization "Bob's Construction") and may be able to collaborate together on Projects (e.g., Project "Boston Hospital"). A user may be defined as a unique human individual, including first and last name, email address, physical address, phone #(s), and avatar photo. Users may log into the media management system 100 via a combination of username and password that is unique to them. Users are managed within an organization by one (or multiple) administrative users. These administrative users can create and revoke user permissions for accessing the system (including resetting passwords).

The media management system 100 may be implemented as a platform for construction and other project oriented industry participants to upload, manage, collaborate on, analyze, and search media 102, including video and image content. The media 102 may originate from project sites or from other locations such as offsite fabrication facilities, multiple business office locations, testing facilities or any other locations relevant to the delivery of the project.

The media 102 may include content depicting (visually and/or audibly) the project or information regarding the project. Examples of information that may be depicted in the media 102 include the following: project progress as shown by amount of new work put in place vs. a prior time period, specific inspection results (e.g., pre-pour concrete inspections) with voice over describing what is being seen, and construction safety infractions or leading indicator behaviors like missed tool box talk attendance which may be correlated with later safety infractions.

Typical hardware used to capture the media 102 includes mobile phones, tablets, activity cameras (e.g., GoPro® cameras), wearable cameras (e.g., body cams), fixed point cameras (e.g., webcams), and unmanned aerial vehicles (UAVs or drones).

The media 102 can be uploaded manually into the media management system 100 or streamed directly into the system via an application interface of the interface 112. For the manual upload use case, an end user can access the interface 112 via a web browser and initiate an upload action. This upload action can only be initiated after the user has logged in and been authenticated in the media management system 100. The content upload may take place on a mobile device or may occur when the end user has returned to an office environment and has access to a laptop or desktop computer. The media management system 100 provides guidance to the user on how to upload the media 102 as well as the status of uploading content. Content may be transferred from a mobile device or camera to the laptop or desktop computer to prepare it for uploading.

The media 102 may also be streamed directly into the media management system 100 via, for example, an API (application programming interface) of the interface 112. The API allows for direct information transfer from devices through API-to-API connections. For example, video content may stream directly from the API of a drone-piloting application that may reside on a mobile device. In another example, a video camera that supports direct streaming could be connected to the API of the media management system 100 for direct upload of media assets into the system. In later use cases, external construction systems for cost, quality, schedule, safety and other aspects of delivery may also leverage the API to define tags.

In some embodiments, the media 102 received by the media management system 100 may be organized using tags 114 from the tag dictionary 106. Tags 114 can be used to categorize entire files or specific parts of content within files, such as clips of videos. Tags 114 may be defined as having a name, a description, a set of synonyms, a default duration and a set of users to be notified when the tags are used (i.e., tag subscribers).

In some embodiments of the media management system 100, tags may be automatically defined using and used to enable interaction with one or more external systems 104. These external systems 104 may include systems for tracking cost, schedule, quality, safety and other aspects of construction projects.

In some embodiments, tags 114 may additionally or alternatively be automatically learned and/or applied based on machine learning techniques. Such machine learning techniques may process media to determine content included within the media. Automatic analysis techniques may be used to derive content from the media, which may be processed using the machine learning techniques to determine tags for the media. As an example of such analysis techniques, text corresponding to speech included in the media, such as derived using automatic speech recognition (ASR) may be processed using machine learning to identify content included in the speech, such as words or phrases used by a person narrating video content to describe what is shown in the video content.

An example of ASR-matched tags is a set of tags 114 created in the tag dictionary 106 that correspond to specific locations in the building, including Room 430, Room 431 and Room 432. If the media management system 100 determines that a person narrating a video states "This is Room 432," the video or a clip of the video may be identified as showing Room 432 of the project. An end user may optionally mark the location of a tag 114 in their spoken track by the use of a "trigger word". A trigger word is a unique utterance that indicates the presence of a tag in the library in the subsequent statement. The term, "Smart-tag" and alternatively, "Hash-tag" both function as trigger words in the system. Thus, when the ASR hears the trigger word, the system knows to expect a key word after the trigger word utterance and updates keyword scoring algorithms. At the point where an utterance matches the tag 114 in the tag dictionary 106 above a confidence interval set by the user in their profile, the tag 114 is inserted in the video to define a clip with a default duration from the tag dictionary 106.

As another example, machine vision techniques may be applied to images or videos to identify content included in an image or in a video, including parts of an image (e.g., a segment of an image, such as a particular set of pixels of the image) or parts of a video (e.g., a clip of the video). Once the content is derived from the media using automatic analysis techniques, the content may be analyzed using the machine learning techniques to determine tags 114 that may be applied and/or to apply the tags 114. If a construction worker is seen to be without critical personal protective equipment, for example a hard hat, then that image can be automatically tagged as "Safety-no hard hat." In this example, the safety-related users may be notified automatically via the concept of tag subscription where users of the media management system 100 may sign-up to receive a notification (e.g., an email, a text message, and a phone call) when a particular tag 114 is associated with media 102. For example, a safety coordinator may setup a tag subscription where the media management system 100 sends an email to the safety coordinator whenever a "Safety-no hard hat" tag is added to media 102.

The media management system 100 may perform various acts to enroll tags for particular users and/or external systems 104 in the tag subscription service and send appropriate notifications when the tags are added to media. In some embodiments, the media management system 100 may receive an indication of a tag from a user (or external system 104) to be added to the subscription service. For example, a user may interact with a user interface of the interface 112 to provide the media management system 100 with an indication of a tag to be added to the subscription service so as to receive a notification when the tag is added to media 102. The media management system 100 may also receive a preference as to the type of notification to be provided (e.g., an email, a test message, or a phone call). The media management system 100 may store the tag and the users associated with the subscribed tag in memory (e.g., a database). Once the media management system 100 has added the tag to the subscription service, the media management system 100 may retrieve the tags in the subscription service from memory when a tag is being added to media 102 and compare the tags in the subscription service with the tag being added to the media 102. If the media management system 100 detects a match between a tag enrolled in the subscription service and the tag being added to the media 102, the media management system 100 may identify the user(s) and/or external system(s) 104 to be notified and provide the appropriate notifications to the identified user(s) and/or external system(s) 104.

It should be appreciated that the tag subscription service may trigger the media management system 100, external system(s) 104, and/or user(s) to perform various tasks when an enrolled tag is added to media 102. In some embodiments, the notification to a particular user may cause the user to perform a particular workflow process. For example, a safety coordinator may, in response to receiving a notification regarding a "Safety-no hard hat" tag being added to media 102, perform a safety violation workflow process where the worker in the media is identified and provided additional safety training. In other embodiments, the notification may trigger an automatic process to be performed by an external system 104. For example, an external system 104 may, in response to receiving a notification regarding a "Safety-no hard hat" tag being added to media 102, record the safety violation in a database.

In the industrial context, information about the physical work to be done (e.g., buildings built, parts manufactured) may be managed in external systems 104. Information coming from external systems 104 can be used to create tags 114 in the tag dictionary 106. This information may come from various databases or files (.xls, .csv, etc), that consist of one or many data elements. Information from these external systems 104 may pertain to critical aspects of construction, namely, schedule, cost, quality (e.g., fidelity with design intent), and/or safety. Examples of these kinds of external construction systems include Autodesk Autocad®, Revit®, BIM 360®, Bentley Navigator®, CMiCR, Newforma®, Procore®, Meridian Prolog®, Tekla Structures®, Viewpoint®.

Data elements contained in these external systems 104 that may be used to create tags 114 in the tag dictionary 106 may include but are not limited to locations (e.g., rooms, floors, other spaces), materials (e.g., steel, concrete), equipment (e.g., pumps, VAV boxes), cost codes, activity IDs, safety policies, and other more specific parts of the physical environment. These data elements are used for their own specific workflows in these external systems 104. For example, in Building Information Model (BIM) systems, data elements called "Objects" are used to define the specific materials that are used in constructing and assembling a building project. A unique steel beam (or alternatively a piece of building equipment such as a horizontal pump) in BIM is an "Object" with a unique ID, unique x/y/z location within the 3D building model, and properties of length, width, height, material, shape, color, texture, and more. Objects in these BIM systems can be grouped into like "Families" that are then useful for managing groups of objects. For example, all of the steel beams may be a part of the steel "family" which can then be summed up to determine the total amount of steel necessary to procure for the project. Families of objects are used for bulk edits and other cross-object operations in the BIM system. The media management system 100 may present the objects contained in these families in a tag import user interface (e.g., included in the interface 112) to give the end user a mechanism for choosing which of the objects in the external system 104 (in this case BIM) they would like to bring into the tag dictionary 106. These data objects include data elements, each having a unique identifier, a name, and other data (e.g., Room 513).

Sample Family data characteristics include: Family, FamilySymbol, and FamilyInstance. Specific examples of Family instances may include: Air Terminals, Boundary Conditions, Casework, Communication Devices, Data Devices, Electrical Equipment, Electrical Fixtures, Entourage, Fire Alarm Devices, Furniture, Furniture Systems, Generic Models, Lighting Devices, Mass, Mechanical Equipment, Parking, Plumbing Fixtures, Security Devices, Site, Specialty Equipment, Sprinklers, Structural Connections, Structural Foundations, Columns, Structural Columns, Doors, Windows, Structural Framing (Beams, Braces), Detailed Components and more.

The data structures and elements are passed into the media management system 100 and define entities in the tag dictionary 106 in the following manner. There is a tag import user interface (e.g., included in the interface 112) and database structure in the media management system 100 to specify which external files or systems should be used to create tags 114 in the tag dictionary 106. In the tag import interface, the specific source(s) of information to create tags 114 may be configured. For example, the tag import interface may enable visualization of the specific data elements available for import from the external system 104. When viewing data structures in external systems 104, the media management system 100 tag import interface may display them in an easy-to-understand manner that makes the selection of the specific data elements straightforward. This may include translating the data taxonomy from the external system 104 into a visual hierarchy in the interface 112. As discussed above, the use of object families (or similar hierarchical structures) may be used to organize the object data from the external system 104 in the interface 112. As in the steel example, the concept of "families" or groupings of objects may be used. This hierarchical display of data elements may be leveraged by the user to choose which data elements they want to use for to create tags 114 and for subsequent integration back into the originating external system 104. This option (making the data in media management system 100 available to the originating external system 104) creates a two-way information flow that may be very valuable to the end user. For example, information may flow from an external system 104 to the media management system 100 and be employed to create tags 114 in the tag dictionary 106. Then, the smartag engine 108 may match the tags 114 in the tag dictionary 106 with features in the media 102 to add tags 114 to the media 102. The external system 104 may then, in turn, have access to the tagged media in the media management system 100.

Once the relevant data elements are selected for import, the subsequent passage of these structures and elements may happen manually (e.g., via file import), programmatically (e.g., via an API, or application programming interface) or some combination of the two. In some embodiments, each of the tags 114 in the tag dictionary 106 may include a unique ID. This unique ID, sometimes referred to as a GUID, uniquely binds the data element that is the source of the tag 114 to the tag 114 in the media management system 100.

The tag dictionary 106 contains an instantiation of the tags 114 coming from external systems 104 (as described above) as well as those defined within the media management system 100. Tag import may be done by certain users with administration rights at the Organization or Project level. Tags 114 in the tag dictionary 106 may include fields such as: Name, Description, Aliases (synonyms), Links to external systems (e.g., GUID), and Recording of standard pronunciations. The tags 114 may also include data associated with them to assist in the machine learning auto-detection using the smartag engine 108 including, for example, Recording of standard pronunciations, Phonemes defining how a tag is pronounced, Imagery showing standard depiction of the tag, GPS locations that may refer to specific areas of interest, 3D volumetric information that defines a tag.

When media 102 is ingested into the media management system 100, the smartag engine 108 attempts to match tags 114 in the tag dictionary 106 against the ingested content. The smartag engine 108 auto-tags the media 102 that matches the tags 114 in the tag dictionary 106. The automatic tagging (or smart-tagging) uses multiple methods to match tags 114 from the tag dictionary 106 to the content. These methods include, for example, extracting the audio from the video feed and using ASR (i.e., Automatic Speech Recognition) techniques such as keyword spotting to identify the matching tags. In order to facilitate matching of tags in audio-content, a trigger word will be used by the speaker. In one example, the speaker would say "Smart-tag" then say the [tag name] to indicate the presence of a tag (i.e., "Smart-tag Room 513"). Other techniques used include machine vision techniques of object identification (in frame).

When recognized, a tag instance represents a specific match between the media 102 (e.g., video and/or photo) and the tag 114 from the tag dictionary 106. These matches or "Tag instances" apply at the entire file level or to individual time coded entry points in video content. During the Smart-tagging process, the smartag engine 108 may tag the utterance "Room 513" as the beginning point of an instance of the tag 114. The duration of the tag 114 may be a standard length as defined in the tag definition. The tag instance may retain a link to the original tag 114 in the tag dictionary 106.

With the case of recognized images, the tag start point will be at the first recognized frame of the said imagery. For example, the Tag "Safety Issue-No Hardhat," will appear if a person is seen in a given video without a hard hat.

In some embodiments, the media 102 may include GPS information indicative of a location where the media 102 was captured. In these embodiments, the media management system 100 may apply one or more tags 114 to the media 102 based on the GPS information. For example, the media 102 may be an image captured by a camera mounted to aerial drone and include GPS information indicative of the location of the drone and orientation information indicative of an orientation of the camera. In this example, the media management system may add tags relating to the components of the premises shown in the image by, for example: (1) receiving a 3D model of the building from an external system 104 and/or a user, (2) mapping the 3D model to geographic coordinates (e.g., longitude and latitude), (3) comparing the GPS information associated with the image to the geographic coordinates associated with the building to determine a location of the camera relative to the building, and (4) determining a portion of the building that is in the field of view of the building based on the determined location of the camera relative to the building and the orientation information of the camera. It should be appreciated that the drone may capture multiple images of the building and the media management system 100 may tie these images together to form a "halo" of visual perspectives of the building.

After the media 102 is tagged, a number of collaboration and sharing steps may occur. For example, these individual tags 114 can be shared with other users in the system. Interactions with the content include commenting on it, marking it up. The system also enables threaded commentary on the specifics noted in the content. Analytics of the tagged content is then possible. The media management system 100 is, in some embodiments, a media platform based on flexible metadata tags 114 that are defined ahead of time (or over time) and have permanence. These tags 114 may go beyond simple "keywords" because they may be a structure in the database. This allows for new features like a "coverage report" that shows the incidence of media 102 by tag 114 from the tag dictionary 106 across time.

As mentioned previously, the tag dictionary 106 is then a connection point for integration to and from other systems, including 2D and 3D design systems. When an external system 104 has been used to create tags 114 within the tag dictionary 106, the external system 104 may automatically show a button/icon in its user interface on each of the objects that have been used to define tags (and for which tagged content exists). By clicking on this button/icon, the user is taken from that system, a web browser is launched and they are taken into the media management system 100. The context is automatically set to show the tagged media 110 that relates to that tag.

Here is an example, as depicted in the diagram of FIG. 1. A user has used database objects from a design system like Autodesk's Revit to create instances in the tag dictionary 106 corresponding to the $2^{nd}$ floor rooms. These include rooms 201, 202, 203 etc. The user (or others in their organization) then upload content into media management system 100 where it is processed and scanned for instances of the keywords "Room 201", "Room 202" and "Room 203" in the audio track. Where these keywords are detected, a tag is inserted automatically into the content at the time point where the tag is recognized. Tags 114 are also manually inserted in the media management system 100. Now that there is content that has been tagged, the media management system 100 notifies the external system (in this case, Autodesk's Revit) via a programmatic API that there are tags created for those corresponding objects in the native 3D Revit model of the space. Now Revit will show an icon for the tagged content directly in its own user interface, notifying (and providing a launching point) for accessing the content directly from the model. At this point, a Revit user, who may be in an office far away from where the work is being completed, can now click on an icon in their model and move from a virtual world of 3D design to access the "real world" of video and photo assets associated with that specific object. Of note, the access to the Revit model may be from a desktop, mobile device or even an augmented or virtual reality headset.

Discussion of Other Embodiments

As should be appreciated from the discussion above, embodiments are not limited to operating with premises that are construction sites or that relate to construction projects. In addition, embodiments are not limited to operating with construction information management systems. In other embodiments, media may be produced during an inspection of a premises that is not a construction site, and/or media may be managed in accordance with information retrieved from information management systems that are not construction information management systems. In some such embodiments, just as in embodiments described above relating to construction projects media may be managed according to components of a premises that are related to the media, such as a room of a structure that is depicted in the media. In addition, other types of information may be used by the media management system to manage the media.

For example, in some embodiments media may be produced during an inspection of a premises that is conducted as part of an insurance underwriting and/or as part of an appraisal for a loan to be secured by the premises. The premises may include one or more structures that have already been built and that are not to be renovated, or are otherwise not a part of a construction site at the time of the inspection. The media management system may manage this media in accordance with information retrieved from one or more information management systems that store information for an insurance entity, a loan issuer, a premises appraiser, or other entity.

As a specific example, the media management system (e.g., media management system 100) may manage media on behalf of an insurance entity, to assist with underwriting. The media may have been produced during an inspection of the premises performed as part of underwriting. Information retrieved from an information management system may include information on practices that may be encouraged, required, or prohibited by an insurance policy that is to apply to the premises. The information on the policies may relate to conditions of premises, including conditions of land and/or of structures. The conditions may be relevant to evaluating or identifying potential hazards at the premises, may be relevant to appraising the premises, and/or may be relevant to documenting a condition of the premises at the time of the inspection and prior to issuance of the policy. Such conditions of premises may relate to zoning or building code regulations, or safety regulations that are applied by an industry group, a government agency, and/or an insurance entity. The information on the policies may also relate to personal property that may be included in a premises, such as personal property that may or may not be covered by insurance policies that may be or are to be applicable to the premises.

As discussed above in connection with construction projects, information from the information management systems may be imported into the media management system and used to define "tags" or other metadata to associate with media. For example, tags may relate to water damage to a premises, to fully intact walls or windows, to stairs having handrails of appropriate height, to professional equipment indicative of a potential commercial use of a premises (which may be relevant for a residence where such commercial use may be prohibited), to potential dangers at a home such as a pool without a surrounding fence, or to specific personal property that is located in the premises and that is to be covered by the insurance policy. These tags may be created in the media management system in response to retrieving related data from an information management system. For example, if an information management system stores information indicating that an insurance policy requires handrails of a certain height, then the media management system may create a tag for the handrails of the certain height. As another example, if an information management system stores information indicating that a television is a piece of personal property that is to be covered when present in a home, then the media management system may create a tag for a television.

The media management system may also evaluate the media to identify which metadata (including tags) to associate with the media. In examples for construction sites described above, the media management system was described as evaluating content of the media, including audio and/or video of the media, to determine tags to apply to the media or to specific portions of the media. Similar techniques may be used in evaluating media to determine insurance-related metadata to apply. For example, if the media management system determines that a photo or video depicts water damage, the system may apply a "water damage" tag to the photo/video. If the media management system determines that a photo or video depicts a pool without a surrounding fence, the media management system may apply a "pool without fence" tag to the photo/video.

As discussed above, the media management system may apply such tags in a variety of ways. In some embodiments, the media management system may evaluate audio for particular keywords or key phrases. For example, if narrative audio for a video includes language stating that the video (or a part of a video) is of a pool without a fence, then the system may apply the "pool without fence" keyword to the video (or a part of the video). In some embodiments, the media management system may additionally or alternatively use machine learning to evaluate image or video contents. For example, the media management system may use machine learning techniques (including known machine learning techniques) to learn what a television looks like in a photo or video. Subsequently, the media management system may evaluate image data and, when the machine learning system identifies that a television is included in a photo or video, the system may apply the "television" tag to the photo/video. Such techniques, including machine learning techniques, may be used to determine types of metadata to apply to media.

Other techniques are described above (in the context of construction projects) for determining tags or other metadata to apply to media based on information retrieved from an information management system, and for determining which of these tags/metadata to apply to media. Those skilled in the art will understand from the foregoing description that such techniques are equally applicable to other types of inspections of premises and other types of information retrieved from information management systems, including for insurance and/or appraisal purposes. Those skilled in the art will further understand how to adapt those techniques for these other scenarios.

Discussion of Example Processes

Aspects of the present disclosure relate to media management systems (e.g., media management system 100) that organize media relating to a premises, such as construction projects, real estate (e.g., commercial buildings, residential buildings, industrial buildings, and parking lots), and cars. These media management systems may organize media by, for example, assigning one or more tags to the media. Each of the tags may be descriptive of content in the media that relates to the premises. The tags may be of various types as illustrated below in Table 1:

TABLE 1

Example Types of Tags

| Tag Type | Tag Type Description | Example Tags |
|---|---|---|
| Component Tags | Tags indicative of a component of the premises | Room 101, East Wing, Floor 4 |

TABLE 1-continued

Example Types of Tags

| Tag Type | Tag Type Description | Example Tags |
|---|---|---|
| | exemplified in the media | |
| Equipment Tags | Tags indicative of particular equipment exemplified in the media | Furnace, Conveyor Belt, Junction Box, Pipe, Lighting Fixture |
| Defect Tags | Tags indicative of a defect exemplified in the media | Crack in structure, Defect in a conveyor belt |
| Safety Tags | Tags indicative of a safety violation exemplified in the media | Worker without hardhat, Worker without respirator, Worker without fall protection equipment, Worker without safety glasses |

The tags added to the media may be employed to ease storage and retrieval of the media, including through categorizing media for storage and/or searching for particular media. For example, the media management system may apply a tag "room 204" to media depicting Room 204 in the building. In this example, the media management system may receive a request from a user to display all of the media relating to Room 204 and the media management system may, in response, search for media including the tag "Room 204" and display all of the media with that tag to the user. Accordingly, example processes are described below to associate these useful tags with media ingested by the media management system.

Figure 2:
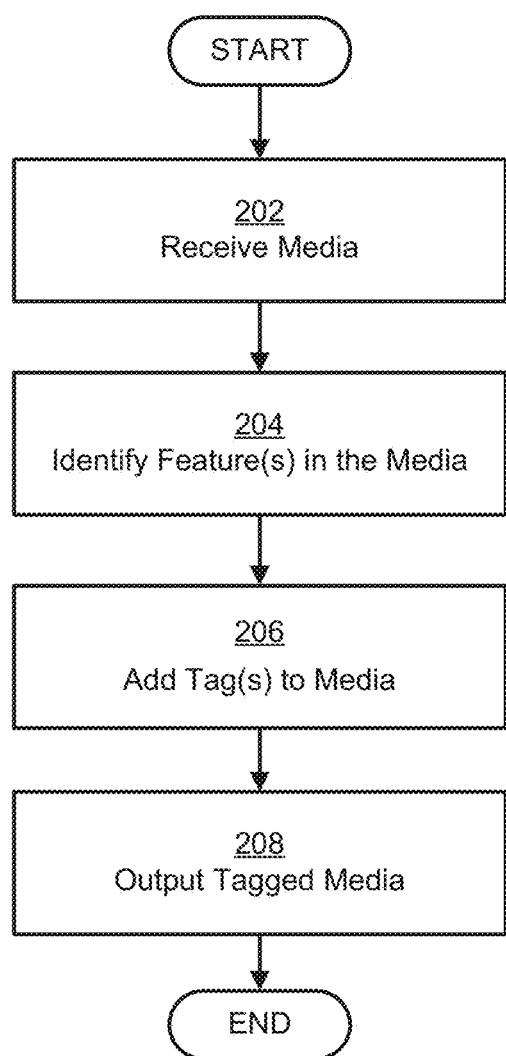
FIG. 2 is a flowchart of an example process for tagging media.

FIG. 2 shows an example media tagging process 200 that may be performed by a media management system (e.g., media management system 100) to assign tags to media. The media tagging process 200 includes an act 202 of receiving media relating to the premises to be tagged, an act 204 of identifying feature(s) in the media, an act 206 of adding tag(s) to the media based on the identified feature(s), and an act 208 of outputting the tagged media.

In act 202, the media management system may receive media relating to the premises. For example, the media may include content depicting the premises that was captured by a user during a routine inspection of the premises. The media may be in any of a variety of formats. The received media may be, for example, an image, a video clip, audio clip, a 3D image or 3D video, a 3D point cloud, or a narrated image (e.g., an image with an associated audio clip). The media management system may receive the media from users through a user interface and/or automatically through an application interface as discussed above with reference to FIG. 1.

In act 204, the media management system may identify feature(s) in the media. These identified feature(s) may be subsequently employed by the media management to associate one or more tags with the media. It should be appreciated that the particular feature(s) identified in the media may vary based on, for example, the particular tags to be associated with the media. Various examples are described below to illustrate some of the possible ways to identify feature(s) in the media.

In some embodiments, the media management system may identify feature(s) in the media by analyzing metadata included in the media. Analyzing the metadata included with media may reveal information associated with the location of the content depicted in the media. For example, the media may include GPS coordinates as metadata indicative of the location where the media was captured. In this example, the media management system may identify feature(s) in the media by extracting the GPS coordinates from the metadata of the image. These GPS coordinates may be converted into a particular location on the premises that may be employed to match, for example, component tags with the media (e.g., a tag associated with a room, floor, and/or wing in a building).

In some embodiments, the media management system may identify feature(s) in the media by identifying words in the media that relate to the premises. Analyzing the words (spoken or written) in the media may also reveal information associated with the location of the content depicted in the media. As discussed above, the media may include words indicative of the particular location where the media was captured. For example, the media management system may have access to audio that is associated with visual media (e.g., image, video) and describes contents of the visual media. The audio may have been captured at the same time as the visual media, such as through a user who is capturing the visual media narrating the visual media as it is captured. In such cases, the system may analyze the audio to determine from the audio the contents of the visual media. For example, if through interpreting the audio with a speech recognition engine the system determine the audio includes a phrase such as "This is Room 205" the system may determine that the visual media depicts "Room 205" of a premises. As another example, the media management system may parse contents of visual media to determine whether the contents include words that indicate contents of the visual media. This may include, for example, a sign in an image/video stating "Room 205"). In cases such as this where the media is a video or an image, the media management system may identify written words using various optical character recognition (OCR) techniques. These identified words may be subsequently used to match, for example, component tags with the media (e.g., a tag associated with a room, floor, and/or wing in a building).

In some embodiments, the media management system may identify feature(s) in the media using various machine learning techniques. These machine learning techniques may allow the media management system to identify a range of features in the media such as the presence or absence of: particular equipment in media (e.g., for equipment tags), safety equipment in media (e.g., for safety tags), and/or defects (e.g., for defect tags). In these embodiments, the media management system may generate a model of each feature to be identified in the media, such as through using training using a "labeled set" of data known to represent the feature, and subsequently compare the model of the feature (s) to one or more aspects of captured media to determine whether the feature(s) are present in the media. An example process for generating a model of a feature to be detected is shown below in FIG. 3. It should be appreciated that these machine learning techniques may be employed to identify any of a variety of features in the media. For example, the media management system may train a model with multiple images of cracks in concrete and use the model to identify cracks in images/video of a tunnel. In another example, the media management system may train a model with 3D models of equipment and use the model to identify the equipment in images/video. In yet another example, the media management system may train a first model with images of people and train a second model with images of safety equipment. In this example, the media management system may use these models to determine whether a worker is present without the proper safety equipment (e.g., without a hardhat). As another example, the system may train a combined model of images of people wearing hardhats, or a model of a human face with a hardhat disposed vertically above the face.

In some embodiments, the media management system may also use machine learning techniques to identify various dimensions of the identified features (e.g., length, width, height, length, volume, or other dimensions) that may be subsequently added to the media as tags. In these embodiments, the media management system may be trained to recognize objects with known dimensions (e.g., a width of a door or a height of a wall) and compare the detected objects of known sizes in the media with the identified feature. Thereby, the media management system may derive a scale for the image (e.g., a certain number of pixels corresponds to a certain distance in inches).

For example, the media management system may recognize a door in an image (or video, though an image is described in examples below for ease of explanation) that, in the image, is 500 pixels wide, and retrieve information from a data store of known dimensions indicating that the a standard-width door is 36 inches wide. Using that information, the system may derive a scale for the image, where 500 pixels equals 36 inches. Scales may be similarly derived using any other items recognized in images, such as heights of walls by retrieving from the data store information on standard heights of walls, or dimensions of known equipment recognized in the image by recognizing the equipment in the image and subsequently retrieving dimensions for that equipment from the data store. Any suitable item that the system may be trained to recognize in an image (e.g., using machine learning techniques described below) and for which dimensions are known and may be stored in and retrieved from a data store may be used as a reference item in an image to derive a scale for the image.

Using information on dimensions of recognized objects and a derived scale for an image, the system may derive dimensions of other items in an image. For example, the system may be trained to recognize a crack in an image, such as a crack in a wall that may require monitoring and/or repair before it jeopardizes structural integrity of the wall. Examining a construction project for such cracks may be a part of inspecting the construction site. When processing in image, such a trained system may recognize a crack and further recognize that the length of the crack, including any branches of the crack or any other contiguous portions of the crack, is 1000 pixels long. If the media management system previously identified a scale of the image based on a standard-width door in the image (using the example above for simplicity, 500 pixels=36 inches), the system may be able to identify the crack as having a length of 72 inches, based on the crack being twice as long as in pixels as the door. In some embodiments, when a scale is determined for an image, the scale may be re-used between images (or other media) of a set. This may be the case when a set of images are captured at the same location, of the same objects, or the content is otherwise related. In these cases, it may be likely that the images may have the same scales. When a scale is determined for one image of the set, it may therefore be re-used with other images of the set. Thus, for example, if a scale is determined based on a door in one image of a set, that scale may be re-used for another image of a set that did not include the door.

In some embodiments, input on dimensions of items in the image may be received from manual input as well, such as through a user indicating dimensions of a recognized object. Such manual input may have been derived for objects in the image (or other media) at a time that the image was captured.

For example, a user may document dimensions of a crack or other defect in a construction site, and determine dimensions of the crack/defect at the same time. In some embodiments, such information may be used to train the system to recognize dimensions of items, as part of recognizing the items. For example, the user may input the dimensions (such as length, width, volume, or other dimensions) of a particular crack/defect to the system as part of training the system to recognize a crack, such as using a machine learning process described herein (including the machine learning process described below in connection with FIG. 3). With such input, the system may be trained not only to recognize cracks and defects, but also to recognize dimensions like length or volume of cracks.

It should be appreciated that the various dimensions of the feature determined may be employed to determine various integrity scores that may be subsequently added to the media as tags. For example, the media management system may use the identified features of a crack (and/or the total number of pixels identified as illustrating the crack) to generate a crack score indicative of an amount of crack illustrated in the image.

In act 206, the media management system may add tags to the media based on the identified features in the media. In some embodiments, the media management system may compare the feature(s) identified in the media with tags in the tag dictionary and add tag(s) that match the identified features to the media. For example, the identified features may include words regarding a particular room that the media was captured in. In this example, the media management system may compare the identified words to tags in the tag dictionary and add the matching tags. It should be appreciated that the tags may be organized in a hierarchy and adding a matching tag from a lower level of the hierarchy may also, automatically, add tags from the higher levels in the hierarchy. For example, a room tag may be on the bottom of a hierarchy that includes a floor tag embracing the room and a wing tag embracing the room tag. In this example, the associated floor and wing tags may be added to a piece of media when a match is detected with the room tag.

In act 208, the media management system may output the tagged media. In some embodiments, the media management system may store the tagged media in tagged media storage, display the tagged media to a user via a user interface, and/or transmit the tagged media to an external system. In other embodiments, the media management system may communicate with an external system (e.g., through an API) to create a link in a user interface of the external system to the tagged media (or any portion of the tagged media). For example, the media management system may send a URL to a BIM software application (e.g., Revit) to access tagged media associated with a particular room in a building. In this example, the media management system may trigger the BIM software application to include the URL as metadata associated with the room in the building. Thereby, a user interacting with the BIM software application may click on the URL and open a window in the media management system that displays all of the tagged media associated with the room.

Figure 3:
FIG. 3 is a flowchart of an example process for building a model of a feature to be identified in the media.
Figure 3:
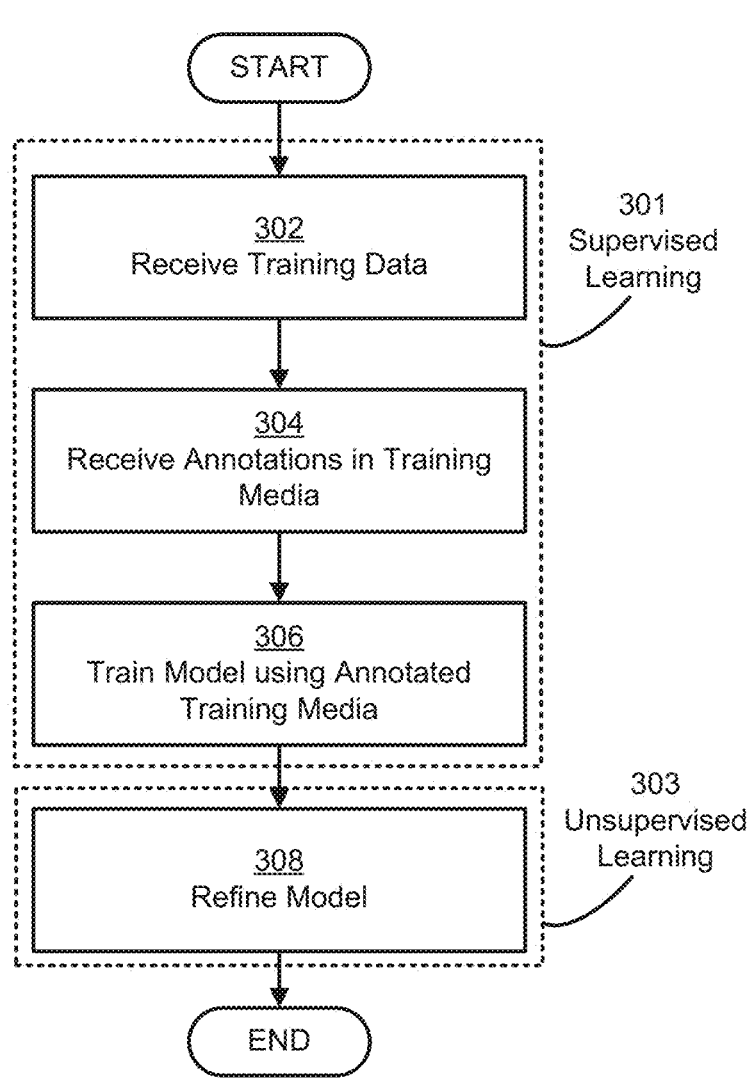

As discussed above, the media management system may employ various machine learning techniques to identify features in the media. These machine learning techniques may, for example, leverage models of the features to be identified in the media. These models may be constructed using various supervised and/or unsupervised learning techniques. In supervised learning, the media management system may train a model using training media including the features to be identified (e.g., images a concrete slab with cracks) in addition to annotations in the training media indicative of a location of the features in the training media (e.g., markings showing where the cracks are located in the images). In unsupervised learning, the media management system may train a model using training media including the features to be identified that are not annotated (e.g., the dimensions of the cracks in the images). An example model building process is shown in FIG. 3 by model building process 300. As shown, model building process 300 includes a supervised learning phase 301 and an unsupervised learning phase 303. The supervised learning phase 301 includes an act 302 of receiving training media, an act 304 of receiving annotations in the received training media, and an act 306 of training the model using the annotated training media. The unsupervised learning phase 303 may include an act 308 of refining the model.

In act 302, the media management system may receive training data. The training data may include, for example, training media that includes the feature(s) that the model will be trained to recognize. For example, the media management system may be constructing a model to be used for recognizing cracks in concrete and the training media may include various images of concrete including cracks. The media may be in any of a variety of formats such as images, audio clips, video clips, narrated images (e.g., images with an associated audio clip), and 3D models. For example, the media management system may be constructing a model to recognize particular equipment in an image. In this example, the training media may include a 3D model of the equipment to be recognized.

In some embodiments, the training data may include scale training data to assist in training the model to detect various dimensions of the identified features in the media (e.g., length, width, depth, and size). For example, the scale training data may include images of objects having at least one standard dimension (e.g., width of a door and height of a wall) and an indication of the value of the dimension (e.g., doors are typically 36 inches wide and walls are typically 96 inches tall). The scale training data may be employed to train the model to recognize objects of standard sizes and compare the size of these objects in the image to the size of the identified feature to collect dimension information regarding the identified feature.

In act 304, the media management system may receive annotations in the training media. The annotations may include information indicative of the location of the feature(s) to be identified in the training media. For example, the training media may include images of tunnels with cracks and the annotations may indicate the location of the cracks in the images. In some embodiments, the annotations may be received from users of the media management system via a user interface. For example, the media management system may present the received training data to a user via a user interface and provide the user a paintbrush tool in the user interface to label the feature(s) to be identified (e.g., cracks in an image).

In act 306, the media management system may train the model using the annotated training media. In some embodiments, the media management system may train the model to identify the features marked in the annotated training media. For example, the training media may include images of a tunnel and the annotations in the training media may include labeled cracks in the tunnel. In this example, the media management system may be trained to identify cracks using the annotated training media.

In act 308, the media management system may refine the model. In some embodiments, the media management system may train the model to identify characteristics of the annotated features that were not included in the annotated training media such as various dimensions of the identified feature. For example, the media management system may receive images including cracks as training media and only receive an indication of the location of the cracks in the images as annotations and not the width or length of the cracks. The media management system may refine the model to recognize the dimensions of the identified media based on the scale training data received in act 302. For example, the scale training data may be employed to train the model to recognize objects of standard sizes and compare the size of these objects in the image to the size of the identified feature to collect dimension information regarding the identified feature. Thereby, the media management system may refine the model generated in act 306 to identify various dimensions of an identified feature (e.g., a crack) that were not included in the annotations (e.g., a length of the crack).

Having described example processes, it should be appreciated that various alternations may be made to the described processes without departing from the scope of the present disclosure. For example, various acts may be omitted, combined, repeated, or added. Further, the acts in any of the processes described herein do not need to be performed in the particular order shown.

Computer Implementation

Techniques operating according to the principles described herein may be implemented in any suitable manner. Included in the discussion above are a series of flow charts showing the steps and acts of various processes that manage media regarding a premises using information received from one or more information management systems. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 406 of FIG. 4 described below (i.e., as a portion of a computing device 400) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

Figure 4:
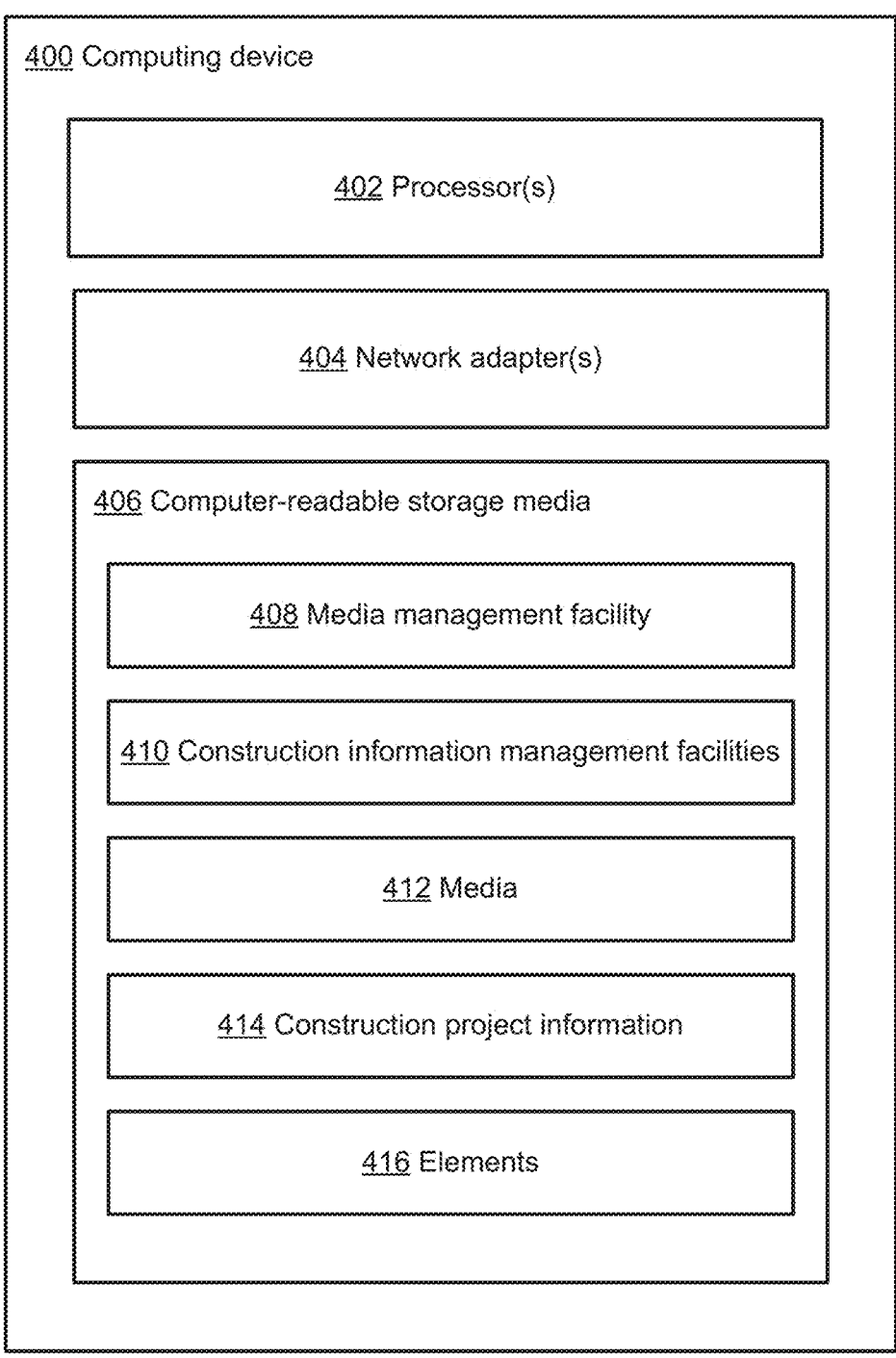
FIG. 4 is a diagram of an example computer system on which various aspects of the present disclosure may be practiced.

FIG. 4 illustrates one exemplary implementation of a computing device in the form of a computing device 400 that may be used in a system implementing techniques described herein, although others are possible. It should be appreciated that FIG. 4 is intended neither to be a depiction of necessary components for a computing device to operate in accordance with the principles described herein, nor a comprehensive depiction.

Computing device 400 may comprise at least one processor 402, a network adapter 404, and computer-readable storage media 406. Computing device 400 may be, for example, a desktop or laptop personal computer, a personal digital assistant (PDA), a smart mobile phone, a server, or any other suitable computing device. Network adapter 404 may be any suitable hardware and/or software to enable the computing device 400 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 406 may be adapted to store data to be processed and/or instructions to be executed by processor 402. Processor 402 enables processing of data and execution of instructions. The data and instructions may be stored on the computer-readable storage media 406 and may, for example, enable communication between components of the computing device 400.

The data and instructions stored on computer-readable storage media 406 may comprise computer-executable instructions implementing techniques which operate according to the principles described herein. In the example of FIG. 4, computer-readable storage media 406 stores computer-executable instructions implementing various facilities and storing various information as described above. Computer-readable storage media 406 may store a media management facility 408 to implement various techniques described above. The storage media 406 may further store one or more information management facilities 410, to store information regarding a premises and/or one or more policy that may apply or are to apply to the premises and from which the media management facility 408 may obtain information regarding a premises and/or policy, as described above. Storage media 406 may further store one or more media units 412, premises and/or policy information 414, and elements 416 (e.g., in the form of a tag library or tag vocabulary for use by the media management facility 408) that were determined or derived by the media management facility 408 from the construction project information 414, as described above. The media management facility 408 may apply the elements 416 to the media 412 as part of managing the media 412.

While not illustrated in FIG. 4, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Additional examples of output devices include immersive 3D environments (e.g., virtual reality environments), such as output devices that enable a user to navigate a 3D model. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A media management system comprising:

at least one processor; and at least one storage medium having encoded thereon executable instructions that, when executed by the at least one processor, cause the at least one processor to carry out a set of actions comprising:

receiving a particular media including content relating to a premises;

processing the particular media using a model to identify a particular defect of an object depicted in the particular media and to determine a physical dimension of the particular defect in the particular media, wherein processing the particular media comprises:

detecting the object and at least one other object depicted in a same image of the particular media;

identifying at least one standard physical dimension of the at least one other object in the particular media;

determining a scale for the particular media based on the at least one standard physical dimension of the at least one other object in the particular media; and determining the physical dimension of the particular defect in the object in based on the scale;

assigning metadata to the particular media responsive to identifying the particular defect in the particular media, the metadata being descriptive of a presence of the particular defect and the physical dimension of the particular defect.

2. The media management system of claim 1, wherein the set of actions further comprises retrieving the particular media responsive to a search for at least part of the assigned metadata.

3. The media management system of claim 1, wherein the at least one other object comprises a wall; and wherein the at least one standard physical dimension comprises a standard height of the wall.

4. The media management system of claim 1, wherein the assigned metadata comprises a name, a description, and information indicating a set of users to be notified when the assigned metadata is used, wherein the set of actions further comprises:

notifying the set of users of the particular defect in the particular media and the physical dimension of the particular defect in the particular media responsive to assigning the metadata to the particular media.

5. The media management system of claim 1, wherein the assigned metadata indicates a safety violation depicted in the particular media, and wherein the physical dimension of the particular defect indicates a size of the safety violation depicted in the particular media.

6. The media management system of claim 1, wherein the assigned metadata indicates a safety violation depicted in the particular media, and wherein the physical dimension of the particular defect indicates that the particular media satisfies a size of the particular defect that is disallowed by a stored policy.

7. The media management system of claim 1, wherein the particular media is a video, and wherein the assigned metadata is stored as a time-coded entry point in the particular media, wherein the set of actions further comprises:

causing display of information identifying the particular defect at the time-coded entry point during the video.

8. The media management system of claim 1, wherein the at least one other object comprises known equipment; and wherein the at least one standard physical dimension comprises a size of the known equipment retrieved from a data store.

9. The media management system of claim 1, wherein the at least one other object comprises a door; and wherein the at least one standard physical dimension comprises a standard width of the door.

10. A computer-implemented method comprising:

receiving a particular media including content relating to a premises;

processing the particular media using a model to identify a particular defect of an object depicted in the particular media and to determine a physical dimension of the particular defect in the particular media, wherein processing the particular media comprises:

detecting the object and at least one other object depicted in a same image of the particular media;

identifying at least one standard physical dimension of the at least one other object in the particular media;

determining a scale for the particular media based on the at least one standard physical dimension of the at least one other object in the particular media; and determining the physical dimension of the particular defect in the object in based on the scale;

assigning metadata to the particular media responsive to identifying the particular defect in the particular media, the metadata being descriptive of a presence of the particular defect and the physical dimension of the particular defect.

11. The computer-implemented method of claim 10, further comprising: retrieving the particular media responsive to a search for at least part of the assigned metadata.

12. The computer-implemented method of claim 10, wherein the at least one other object comprises a wall; and wherein the at least one standard physical dimension comprises a standard height of the wall.

13. The computer-implemented method of claim 10, wherein the assigned metadata comprises a name, a description, and information indicating a set of users to be notified when the assigned metadata is used, the computer-implemented method further comprising:

notifying the set of users of the particular defect in the particular media and the physical dimension of the particular defect in the particular media responsive to assigning the metadata to the particular media.

14. The computer-implemented method of claim 10, wherein the assigned metadata indicates a safety violation depicted in the particular media, and wherein the physical dimension of the particular defect indicates a size of the safety violation depicted in the particular media.

15. The computer-implemented method of claim 10, wherein the assigned metadata indicates a safety violation depicted in the particular media, and wherein the physical dimension of the particular defect indicates that the particular media satisfies a size of the particular defect that is disallowed by a stored policy.

16. The computer-implemented method of claim 10, wherein the particular media is a video, and wherein the assigned metadata is stored as a time-coded entry point in the particular media, the computer-implemented method further comprising:

causing display of information identifying the particular defect at the time-coded entry point during the video.

17. The computer-implemented method of claim 10, wherein the at least one other object comprises known equipment; and wherein the at least one standard physical dimension comprises a size of the known equipment retrieved from a data store.

18. The computer-implemented method of claim 10, wherein the at least one other object comprises a door; and wherein the at least one standard physical dimension comprises a standard width of the door.

19. One or more non-transitory storage media having encoded thereon executable instructions that, when executed by the at least one processor, cause the at least one processor to carry out a set of actions comprising:

receiving a particular media including content relating to a premises;

processing the particular media using a model to identify a particular defect of an object depicted in the particular media and to determine a physical dimension of the particular defect in the particular media, wherein processing the particular media comprises:

detecting the object and at least one other object depicted in a same image of the particular media;

identifying at least one standard physical dimension of the at least one other object in the particular media;

determining a scale for the particular media based on the at least one standard physical dimension of the at least one other object in the particular media; and determining the physical dimension of the particular defect in the object in based on the scale;

assigning metadata to the particular media responsive to identifying the particular defect in the particular media, the metadata being descriptive of a presence of the particular defect and the physical dimension of the particular defect.

20. The one or more non-transitory storage media of claim 19, the set of actions further comprising:

retrieving the particular media responsive to a search for at least part of the assigned metadata.

21. The one or more non-transitory storage media of claim 19, wherein the at least one other object comprises a wall; and wherein the at least one standard physical dimension comprises a standard height of the wall.

22. The one or more non-transitory storage media of claim 19, wherein the assigned metadata comprises a name, a description, and information indicating a set of users to be notified when the assigned metadata is used, the set of actions further comprising: notifying the set of users of the particular defect in the particular media and the physical dimension of the particular defect in the particular media responsive to assigning the metadata to the particular media.

23. The one or more non-transitory storage media of claim 19, wherein the assigned metadata indicates a safety violation depicted in the particular media, and wherein the physical dimension of the particular defect indicates that the particular media satisfies a size of the particular defect that is disallowed by a stored policy.

24. The one or more non-transitory storage media of claim 19, wherein the particular media is a video, and wherein the assigned metadata is stored as a time-coded entry point in the particular media, the set of actions further comprising:

causing display of information identifying the particular defect at the time-coded entry point during the video.

25. The one or more non-transitory storage media of claim 19, wherein the at least one other object comprises known equipment; and wherein the at least one standard physical dimension comprises a size of the known equipment retrieved from a data store.

26. The one or more non-transitory storage media of claim 19, wherein the at least one other object comprises a door; and wherein the at least one standard physical dimension comprises a standard width of the door.

* * * * *